United States Patent [19]

Lawless

[11] Patent Number: 4,866,989
[45] Date of Patent: Sep. 19, 1989

[54] PRESSURE TRANSDUCER WITH A SEALED SENSOR

[75] Inventor: Daniel F. Lawless, Hazel Green, Ala.

[73] Assignee: Chrysler Motors Corporation, Highland Park, Mich.

[21] Appl. No.: 267,908

[22] Filed: Nov. 7, 1988

[51] Int. Cl.⁴ .......................... G01L 9/04; G01L 9/16
[52] U.S. Cl. ........................................ 73/756; 73/706;
   73/726; 73/754; 73/DIG. 4; 310/338
[58] Field of Search ................. 73/431, 756, 706, 707,
   73/708, 115, 719, 720, 721, DIG. 4, 725, 726,
   727, 182, 754; 361/283; 338/4; 310/338; 26/622

[56] References Cited

U.S. PATENT DOCUMENTS

| | | | |
|---|---|---|---|
| 4,151,578 | 4/1979 | Bell | 361/283 |
| 4,177,496 | 12/1979 | Bell et al. | 73/724 |
| 4,207,604 | 6/1980 | Bell | 361/283 |
| 4,227,419 | 10/1980 | Park | 73/724 |
| 4,320,664 | 3/1982 | Rehm et al. | 73/708 |
| 4,513,623 | 4/1985 | Kurtz et al. | 73/721 |
| 4,567,395 | 1/1986 | Pundarika | 73/715 |
| 4,570,097 | 2/1986 | Shukla et al. | 73/715 |
| 4,590,400 | 5/1986 | Shukla et al. | 310/338 |
| 4,616,114 | 10/1986 | Strasser | 200/83 J |
| 4,620,438 | 11/1986 | Howng | 73/715 |
| 4,633,579 | 1/1987 | Strasser | 29/622 |
| 4,645,965 | 2/1987 | Pagnelli | 310/338 |
| 4,732,042 | 3/1988 | Adams | 73/706 |

Primary Examiner—Donald O. Woodiel
Attorney, Agent, or Firm—Kenneth H. MacLean, Jr.

[57] ABSTRACT

A transducer for sensing fluid pressure including an enclosure forming housing, a cup-shaped rubber-like mount having an end wall and an annular side wall for supporting a pressure sensing electronic chip against the inner end wall surface of the mount. The chip is supported against the end wall in covering relation to a small opening in the end wall which connects one side of the chip with atmospheric pressure. A layer of non-hardening sealant gel extending between the inner side wall surface completely covers the chip and transmits fluid pressure to a second surface of the chip but inhibits fluid contact and leakage past the chip.

4 Claims, 1 Drawing Sheet

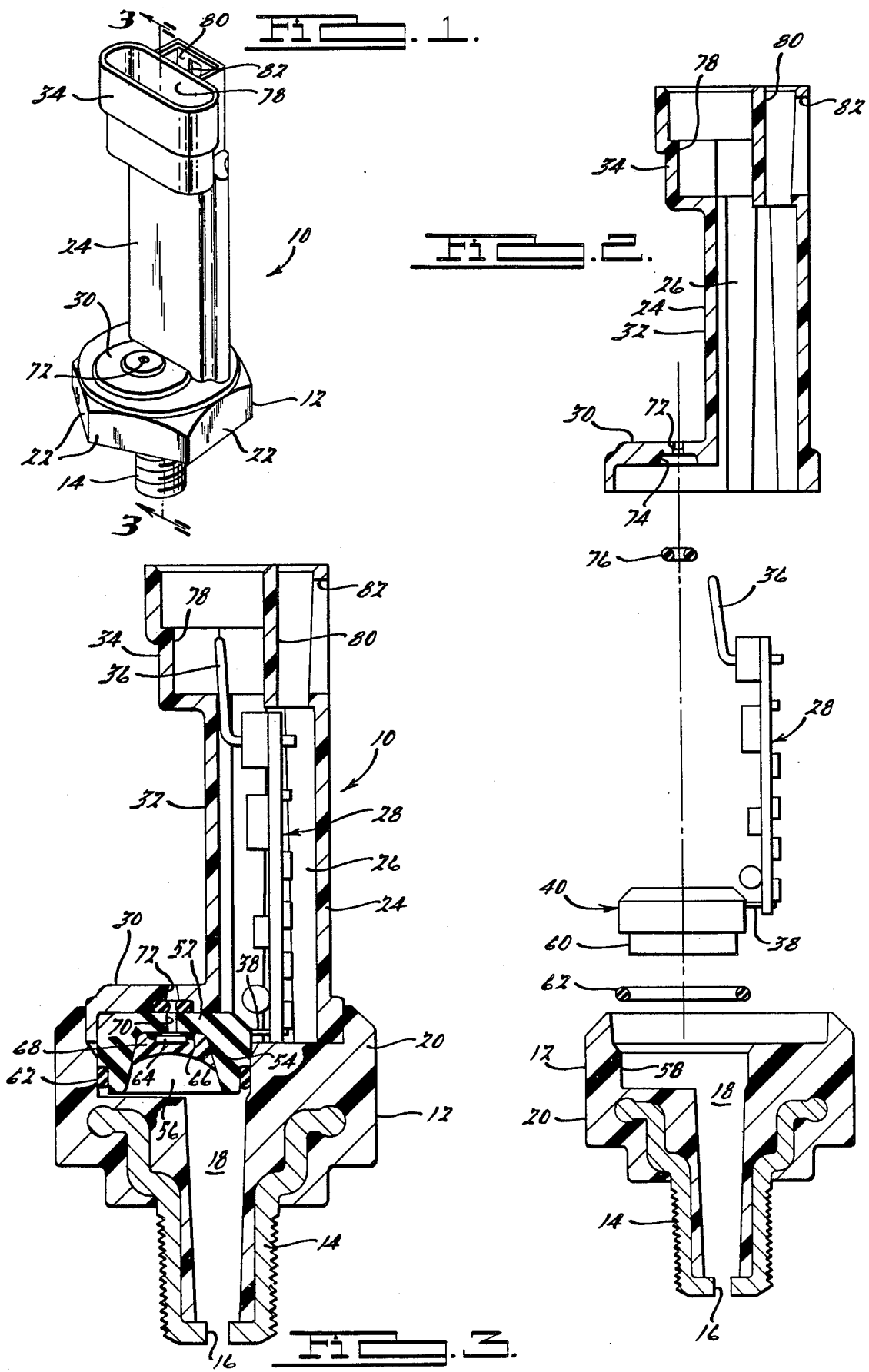

PRESSURE TRANSDUCER WITH A SEALED SENSOR

BACKGROUND OF THE INVENTION

Many fluid pressure sensing and measuring devices exist. There has always been a need for an accurate, durable and relatively inexpensive sensor particularly to sense the oil pressure of internal combustion engines such as used in vehicles. Advances in electronics permit this technology to be incorporated in pressure transducers. Small electronic chips are available which sense a pressure differential between two fluids when their pressures are exerted on opposite surfaces of the chip.

A previous patent application relating to such a transducer was filed by a co-worker of the present inventor and assigned to the same employer. Thus the present application is an improvement over this prior application. The improvement concerns sealing means to prevent fluid leakage past the sensor, particularly when it is subjected to a relatively high fluid pressure and is subjected to many heating and cooling cycles. The previous patent application is identified as U.S. Ser. No. 07/114,331 entitled "Electronic Oil Pressure Sensing Device" by P. D. Miller and filed on Oct. 29, 1987.

In addition to the above identified document, a pressure transducer of this general type is disclosed in U.S. Pat. No. 4,513,623 to Kurtz. This transducer shows a sensor package in outline form mounted in a housing recess and sealed thereto by O-rings.

Specific sensor designs comprising spaced flexible plates are disclosed in U.S. Pat. Nos. 4,151,578; 4,158,217; 4,177,496; 4,207,604 and 4,227,419.

U.S. Pat. No. 4,590,400 discloses a transducer with a piezoelectric cylinder pressure transmitter.

U.S Pat. No. 4,320,664 discloses a silicon pressure sensor.

U.S. Pat. Nos. 4,567,395; 4,570,097; 4,620,438 and 4,645,965 disclose transducers for sensing cylinder pressure.

U.S. Pat. Nos. 4,616,114 and 4,633,579 disclose pressure switches disclosing means to seal the active portion relative to the housing.

SUMMARY OF THE INVENTION

The present electronic pressure transducer is an accurate and relatively inexpensive device for use with an internal combustion engine to sense oil pressures or the like. The pressure sensing is by a small electronic device or chip which is supported by a flexible rubber-like mount. The mount is enclosed within a transducer housing in a manner exposing one side of the chip to pressurized fluid such as oil and an opposite side of the chip to atmosphere as a reference pressure through an opening in the housing.

The specific configuration of the mounting member is cup-shaped defined by an upper end wall and an integral side wall. The walls partially enclose an interior with an open end. The sensor chip is mounted against the end wall and within the open interior. A thick layer of non-hardening sealant gel covers the sensor. This sealant gel is resistant to the fluid whose pressure is being sensed. A small opening in the end wall communicates one side of the sensor chip to atmosphere. The interior of the mounting member and the sealant gel are exposed to the pressurized fluid. The non-hardening gel transmits the fluid's pressure to the sensor chip.

The structure generally described above effectively seals the sensor chip from direct exposure to pressurized fluid and prevents fluid leakage by the sensor. Multiple heating-cooling cycles have not resulted in leakage of the pressurized fluid. Further advantageous features of the subject embodiment will be better understood by reference to the drawings of a specific embodiment as described below and the detailed description of a preferred embodiment.

IN THE DRAWINGS

FIG. 1 is a perspective view of the present transducer; and

FIG. 2, is a partially sectioned elevational and exploded view of the transducer's main parts; and FIG. 3 is a sectioned elevational view of the assembled transducer showing details of the sensor chip and its mounting arrangement.

DESCRIPTION OF A PREFERRED EMBODIMENT

An electronic fluid pressure transducer 10 for sensing and determining the pressure of a fluid such as engine lubricating oil is generally shown in the drawings. The transducer 10 has both sensor means to sense the pressure of a fluid and circuit means to determine the pressure of the fluid. As shown in the drawings, the transducer 10 includes a base member 12 defining an enclosure. The base member 12 is comprised of two main part. It has a generally cup-shaped metal insert member 14 with an externally threaded hollow end portion. The end portion has an opening 16 therethrough. Opening 16 admits pressurized fluid into an interior 18 of the base member 12. Member 14 is partially enclosed or is encapsulated by a molded elastomeric outer portion 20. As best shown in FIG. 1, outer portion 20 has wrench engagable flats 22 so that the transducer and the threaded portion 14 can be readily rotated relative to a threaded aperture as in an engine (not shown).

A thin walled and generally hollow housing member 24 is supported by the base member 12 and is molded of elastomeric material. The housing 24 has an interior space 26 in which a circuit board 28 is supported. The housing 24 has an annularly shaped lower end or base portion 30, a tubular portion 32 which extends outwardly and is offset from the base portion 30 and a female receptacle portion 34 for a connector (not shown) at the other end of the tubular portion 32.

As best understood by examining FIG. 2, the circuit board 28 has terminals 36 (only one visible) extending from the upper edge of the board 28. When assembled as in FIG. 3, the terminals 36 project into the receptacle end portion 34. Also, the circuit board 28 has leads 38 (only one visible) extending from a lower edge of the board 28 which engage a sensor mounting member 40. The mount 40 is molded of flexible rubber-like material such as Valox 420 which is resistant to oil and the like.

As is evident in FIG. 3, the mount 40 has a cup-shaped configuration and is supported in an inverted position. The leads 38 extend through and are molded within the mount 40. The mount 40 includes an upper end wall portion 52 and an integral side wall portion 54. The portions 53 and 54 form an open ended interior space. Assembled with the portion 20 of the base member 12 the mount defines an interior space 56 which is communicated with the interior passage 18. Specifically, the side wall 54 of mount 40 is inserted into a cylindrical recess 58 formed in portion 20. An annular channel 60 is mold formed in mount 40 and an O-ring 62 is placed therein to prevent leakage of oil between the side wall 54 and the portion 20.

The mount 40 supports a generally flat electronic device or chip 64 which is secured against the underside of end wall 52 by a ring 66 of silicone sealant. As previously mentioned, the leads 38 extend through the molded mount 40. They are attached to the chip 64 as is well known in the electronic art. The chip 64 and sealant 66 are completely covered with a relatively thick layer 68 of a non-hardening sealant gel. At the upper side or surface of the chip 64, a small opening 70 is provided through the end wall 52. A second opening 72 is provided in the base portion 30 and is aligned with the first opening to communicate the upper side of the chip 64 with the atmosphere. Also, an enlarged recess 74 in the portion 30 is provided to receive a small O-ring 76. The O-ring 76 bears against the chip 64 to prevent passage of any contaminants.

The passages 70, 72 permit the active portion of the chip 64 to sense the atmospheric pressure which acts as a reference for oil pressure. The passages 16 and interiors 18, 56 allow the pressure of oil to bear against the sealant gel 68, which is transmitted through the gel 68 and creates a force against the lower surface of the chip 64. Resultantly, chip 64 produces an electrical output proportional to oil pressure.

The transducer 10 is adapted to receive a male type electrical connector (not shown) for engaging terminals 36. Specifically, the receptacle portion 34 of member 24 has a first cavity 78 to receive a typical male type connector. The connector is for connecting a wiring harness (not shown) to the circuit board 28 and the chip 64. The typical connector also includes locking means for detachably securing the connector to the housing 24. For this purpose, a second cavity 80 is defined by the receptacle portion 34 to receive the locking means. More specifically, a slot 82 in the receptacle portion 34 is provided to receive a releasable portion of the male type connector. This provides a detachable means between the connector and the receptacle.

Although the previous description of a preferred embodiment of the transducer is directed specifically to only a single embodiment, the invention is not necessarily limited to this specific embodiment as shown and described, since the claims define the invention. It should be understood that the specific embodiment of the invention is subject to modifications which do not necessarily fall outside the scope of the following claims which define the invention.

I claim:

1. In an electronic transducer for sensing fluid pressure and using a sensing chip within an enclosure forming housing, an improved mounting means for the chip which isolates the chip from fluid pressure and is resistant to fluid leakage thereby, comprising: a mounting member having a cup-shaped configuration and being molded of flexible rubber-like material, the mounting member having an end wall portion and an annularly shaped side wall portion thereby defining an open ended interior space adapted to be communicated with pressurized fluid; the end wall portion of the mount having a small opening therethrough adapted to be communicated with atmosphere; a substantially flat sensor chip supported within the mount's interior against the inner surface of the end wall and positioned with a first surface in covering relation to the small opening, the size and the configuration of the sensor chip being sufficient to completely cover the small opening; a non-hardening sealant gel filling a substantial portion of the mount's interior and providing a relatively thick layer over the chip, whereby the gel is exposed to pressurized fluid and fluid pressure is transmitted through the gel to a second surface of the chip opposite the first surface.

2. An electronic transducer for sensing oil pressure in an engine, comprising: a housing with an apertured end portion for securing the transducer to an engine in fluid communication with pressurized oil therein and defining an interior space therein, the housing having a cylindrical recess formed therein communicated with the pressurized oil; a substantially cup-shaped member molded of flexible rubber-like material and having an end wall and an annularly extending side wall thereby defining an opening interior; the recess and the side wall being so sized and configured that the side wall is tightly engaged in the recess thereby directly communicating the interior of the cup-shaped member and the interior of the housing; the end wall of the cup-shaped member having a small opening therethrough for communication with the atmosphere therethrough; a substantially flat sensor chip with opposite first and second surfaces being mounted in the interior the cup-shaped member against the inner surface of the end wall, the chip being so configured and positioned so that the first surface thereof covers the small opening in the end wall; a non-hardening sealant gel filling a substantial portion of the interior of the cup-shaped member to provide a thick layer over the chip, whereby the sealant gel is exposed to pressurized oil so that oil pressure is transmitted to the second side of the chip through the gel.

3. The transducer set forth in Claim 2 in which a channel is formed between the housing recess and the side wall of the cup-shaped member and a resilient annularly shaped seal is tightly positioned therein to prevent leakage therebetween.

4. The transducer set forth in Claim 2 in which a channel is molded in the outer surface of the side wall and an O-ring type seal is located therein so that it engages the recess forming portions of the housing in a leak resistant manner.

* * * * *